(12) United States Patent
Pai et al.

(10) Patent No.: US 10,909,940 B2
(45) Date of Patent: Feb. 2, 2021

(54) METHOD OF HANDLING OVERDRIVE FOR IMAGE DATA AND RELATED OVERDRIVE DEVICE

(71) Applicant: NOVATEK Microelectronics Corp., Hsin-Chu (TW)

(72) Inventors: Feng-Ting Pai, Hsinchu (TW); Jun-Yu Yang, Hsinchu (TW)

(73) Assignee: NOVATEK Microelectronics Corp., Hsin-Chu (TW)

(*) Notice: Subject to any disclaimer, the term of this patent is extended or adjusted under 35 U.S.C. 154(b) by 48 days.

(21) Appl. No.: 16/223,129

(22) Filed: Dec. 18, 2018

(65) Prior Publication Data
US 2020/0193924 A1 Jun. 18, 2020

(51) Int. Cl.
G09G 3/36 (2006.01)
G02F 1/01 (2006.01)
G02F 1/13357 (2006.01)
G09G 3/20 (2006.01)
G02F 1/1345 (2006.01)

(52) U.S. Cl.
CPC .......... *G09G 3/3648* (2013.01); *G02F 1/0121* (2013.01); *G02F 1/13454* (2013.01); *G02F 1/133602* (2013.01); *G09G 3/2022* (2013.01)

(58) Field of Classification Search
None
See application file for complete search history.

(56) References Cited

U.S. PATENT DOCUMENTS

| | | | | |
|---|---|---|---|---|
| 2009/0267888 A1* | 10/2009 | Lo | .......... | G09G 3/3648 345/101 |
| 2011/0169851 A1* | 7/2011 | Chiu | .......... | G09G 3/3648 345/561 |
| 2011/0221762 A1* | 9/2011 | Cheng | .......... | G09G 3/3648 345/611 |

* cited by examiner

*Primary Examiner* — Nicholas J Lee
(74) *Attorney, Agent, or Firm* — Winston Hsu (57) ABSTRACT

A method of handling overdrive for image data includes the steps of: receiving a current image data and a previous image data; obtaining an overdrive image data by finding an overdrive lookup table according to the current image data and the previous image data; generating a weighting mask comprising a plurality of weighting parameters; calculating an output image data by combining the overdrive image data with the current image data according to one of the weighting parameters corresponding to a pixel of the current image data; and outputting the output image data to the pixel.

19 Claims, 11 Drawing Sheets

METHOD OF HANDLING OVERDRIVE FOR IMAGE DATA AND RELATED OVERDRIVE DEVICE

BACKGROUND OF THE INVENTION

1. Field of the Invention

The present invention relates to a method of handling overdrive for image data to be displayed in a panel, and more particularly, to a regional overdrive method for image data to be displayed in a panel.

2. Description of the Prior Art

Liquid crystal display (LCD) is the highest developed and the most popular display device among various flat panel displays in the market, and the mainstream of LCD currently is the active matrix LCD such as a thin film transistor LCD (TFT-LCD). In general, the panel of the TFT-LCD includes a layer of liquid crystals placed between two layers of glass substrates, where the upper glass substrate layer has a color filter and the lower glass substrate layer includes embedded transistors. The transistors may be controlled by a driving circuit, for receiving voltage signals which drive the liquid crystals to be twisted to the angle, so as to generate a desired luminance.

Figure 1:
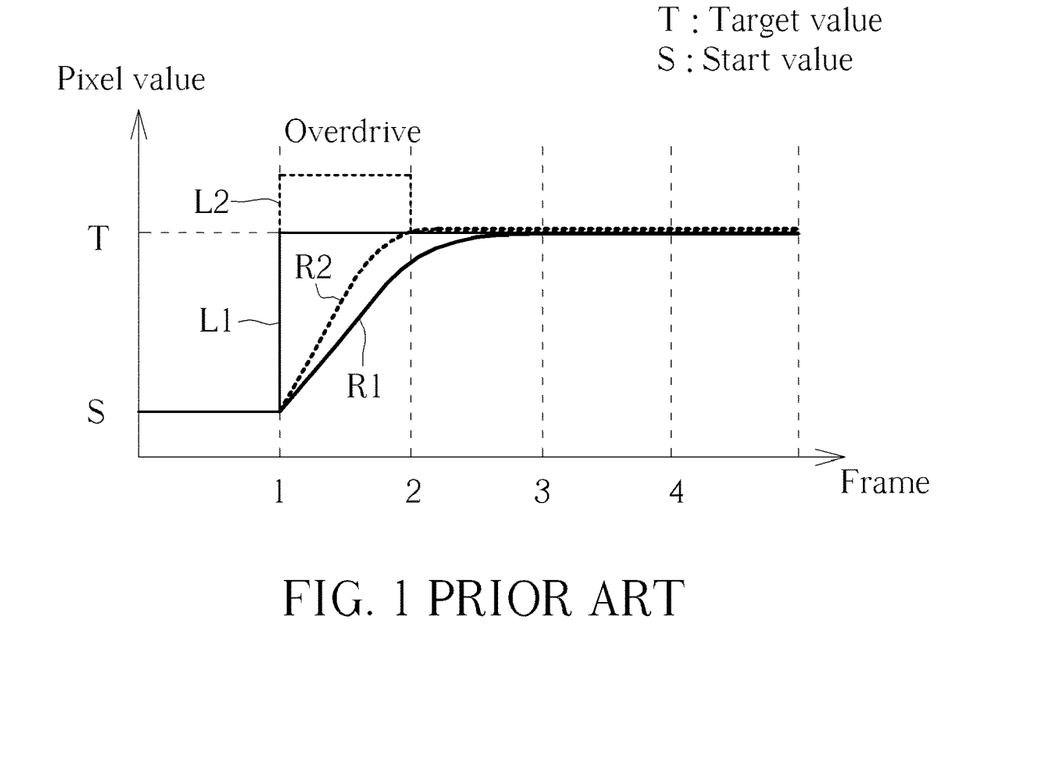
FIG. 1 is a waveform diagram of a general overdrive operation on a pixel.

Since the reaction speed of the liquid crystals may not be fast enough, a voltage value stronger than the predetermined voltage signal is outputted to the transistor to drive the liquid crystals; the operation is called overdrive. Please refer to FIG. 1, which is a waveform diagram of a general overdrive operation on a pixel. The pixel needs to be charged from the start value in Frame 1 to the target value in Frame 2, and a voltage signal L1 is outputted to the pixel. Due to the limited response speed of the liquid crystals, it is difficult to achieve the desired pixel value in a frame. In fact, the pixel value received by the liquid crystals in the pixel may be shown as the curve R1, where the pixel value fails to reach its target level at the beginning of Frame 2. Therefore, the luminance of the pixel may be less than as expected. With the overdrive operation, a higher voltage signal L2 is deliberately applied to increase the response speed of the liquid crystals; hence, the pixel value in response will become R2, which reaches its target value before the end of Frame 1.

In order to realize the overdrive operation, the relation between a current image frame and a previous image frame and the corresponding data variations should be known; hence, a frame memory is required to record the pixel data of the entire previous image frame to be compared with the pixel data of the currently received image frame. An overdrive lookup table (LUT) is applied to find out the overdrive data value based on the relation between the pixel data in the previous image frame and the current image frame. Therefore, a large memory space is consumed to store the LUT, and also a large memory space is required to be served as the frame memory. In addition, every received pixel data should be processed by finding the LUT, which requires a great amount of operation and computation resource. Thus, there is a need for improvement over the prior art.

SUMMARY OF THE INVENTION

It is therefore an objective of the present invention to provide a novel overdrive method, in order to solve the abovementioned problems.

An embodiment of the present invention discloses a method of handling overdrive for image data. The method comprises the steps of: receiving a current image data and a previous image data; obtaining an overdrive image data by finding an overdrive lookup table according to the current image data and the previous image data; generating a weighting mask comprising a plurality of weighting parameters; calculating an output image data by combining the overdrive image data with the current image data according to one of the weighting parameters corresponding to a pixel of the current image data; and outputting the output image data to the pixel.

Another embodiment of the present invention discloses an overdrive device, which comprises a frame memory, an overdrive lookup table and a weighting mask. The frame memory is configured to store a previous image data. The overdrive lookup table, coupled to the frame memory, is configured to receive the previous image data from the frame memory and receive a current image data from an input terminal, and obtain an overdrive image data according to the current image data and the previous image data. The weighting mask, coupled to the overdrive lookup table and comprising a plurality of weighting parameters, is configured to calculate an output image data by combining the overdrive image data with the current image data according to one of the weighting parameters corresponding to a pixel of the current image data. The output image data is outputted to the pixel.

Another embodiment of the present invention discloses a method of handling overdrive for image data. The method comprises the steps of: receiving a current frame of image data and a previous frame of image data; obtaining a frame of overdrive image data by finding an overdrive lookup table according to the current frame of image data and the previous frame of image data; generating a weighting mask; calculating a frame of output image data by combining the frame of overdrive image data with the current frame of image data according to the weighting mask; and outputting the frame of output image data to a display panel.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
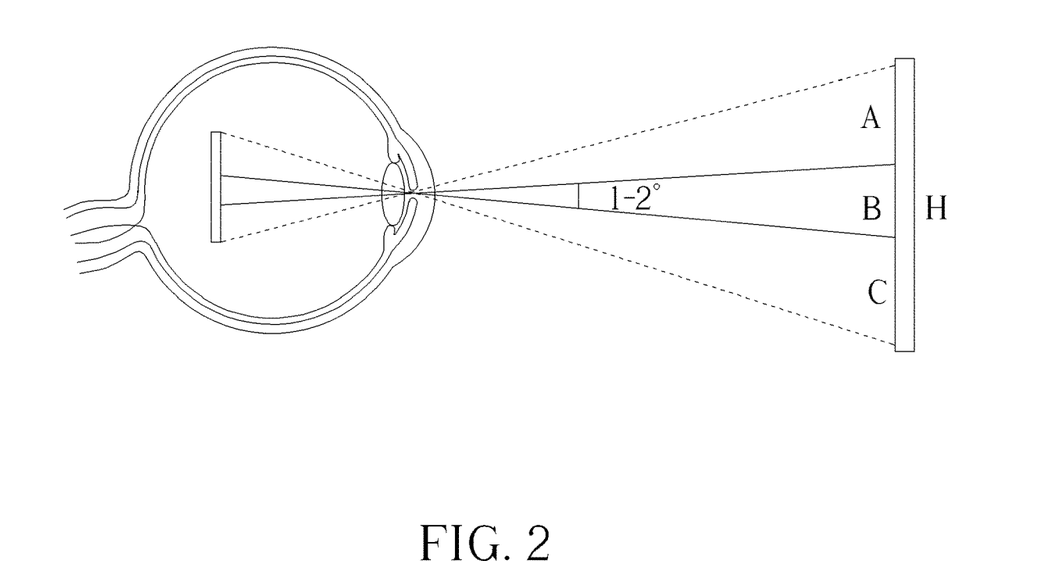
FIG. 2 is a schematic diagram illustrating a human eye watching a screen.

As mentioned above, a great amount of memory space is applied to store the lookup table (LUT) and the entire image frame. The present invention therefore provides a method of performing overdrive to reduce the usage of memory without influencing the image quality. In general, the imaging in the foveal vision area is much clearer than the imaging in the peripheral vision field for a human eye; that is, the human eye is more sensitive to the objects in the foveal vision. The foveal vision is quite small and only occupies 1-2 degrees among the whole visual field. In such a situation, when a human is watching a screen, he/she will usually focus on the central area. As shown in FIG. 2, when a person watches the screen H, only the area B is clear while the areas A and C are blurred, although the entire screen H is seen by the person. Therefore, the overdrive operation may not be required for the entire image frame. A regional overdrive scheme is enough to improve the image quality covered by the foveal vision, while the image quality in peripheral vision field may easily be ignored by the human eye. As a result, if overdrive is performed on partial of the pixel data within a specific region in the image frame, the frame memory only needs to store the pixel data in partial regions and the operation of finding the LUT is required for the specific pixels only; hence, the storage space and computation resource may be saved.

Figure 3:
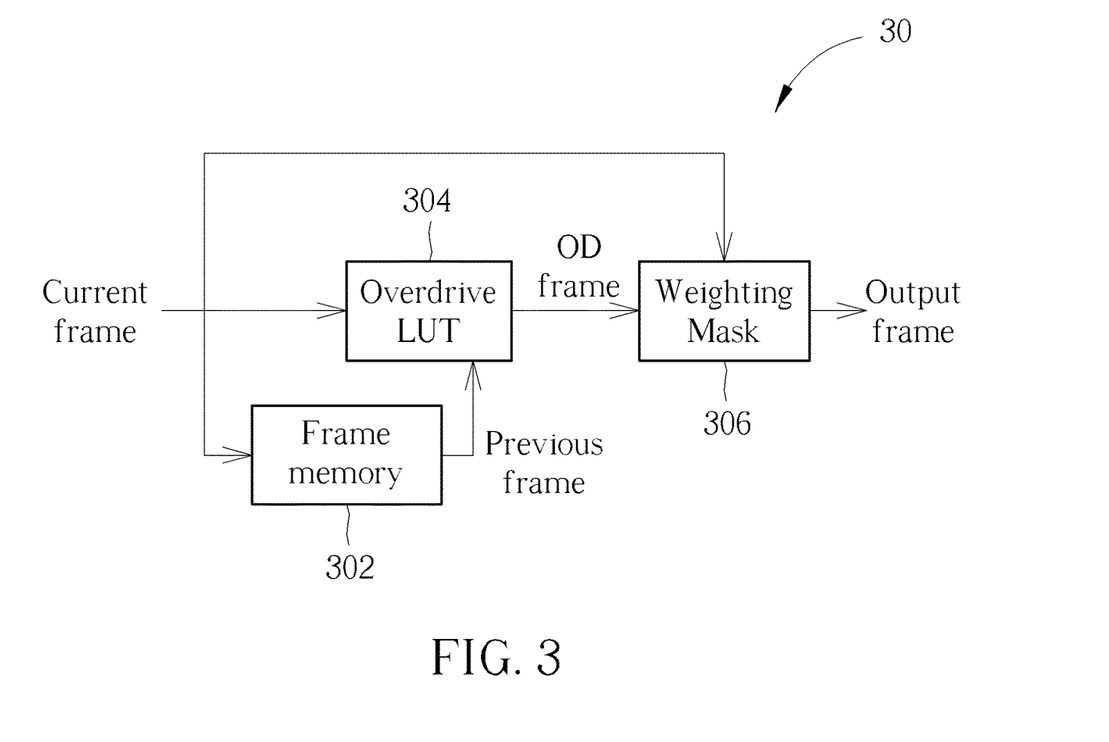
FIG. 3 is a schematic diagram of an overdrive device according to an embodiment of the present invention.

Please refer to FIG. 3, which is a schematic diagram of an overdrive device 30 according to an embodiment of the present invention. The overdrive device 30 includes a frame memory 302, an overdrive LUT 304 and a weighting mask 306. The frame memory 302 is configured to receive a previous frame of image data and store the previous frame of image data. The overdrive LUT 304, coupled to the frame memory 302, is configured to receive the previous frame of image data from the frame memory 302 and receive a current frame of image data from the input terminal. The overdrive LUT 304 then obtains a frame of overdrive image data (i.e., OD frame) according to the previous frame of image data and the current frame of image data. The weighting mask 306, which is coupled to the overdrive LUT 304, is configured to calculate a frame of output image data by combining the frame of overdrive image data with the current frame of image data.

In detail, the weighting mask 306 includes a plurality of weighting parameters, each of which corresponds to a pixel in the display panel. More specifically, an output image data to be outputted to a pixel is calculated by combining the overdrive image data (from the overdrive LUT 304) with the current image data (from the input terminal) according to the weighting parameter corresponding to this pixel. The weighting parameter is a weighting of the overdrive image data in the combination of the overdrive image data and the current image data, and may be a value ranging from 0 to 1.

The weighting mask 306 and the corresponding weighting parameters specify the degree of overdrive performed on the position of each pixel.

Figure 4:
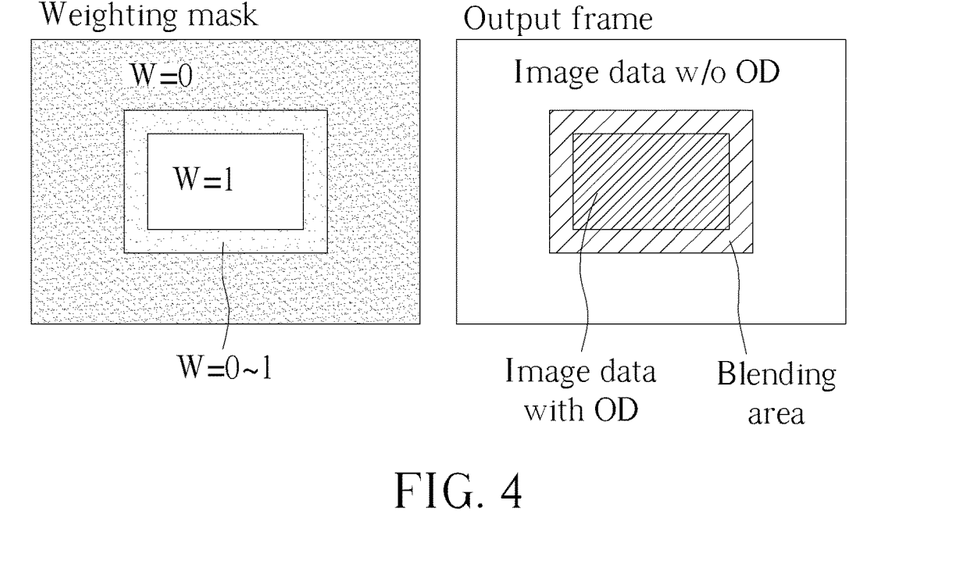
FIG. 4 is a schematic diagram of an example of the weighting mask and related output image frame.

FIG. 4 illustrates an example of the weighting mask 306 and related output image frame. In detail, the weighting parameter W is equal to 1 in the central region, where the output image data entirely comes from the corresponding overdrive image data. The weighting parameter W is equal to 0 in the peripheral region, where the output image data entirely comes from the corresponding current image data without overdrive. In the transition region between the central region and the peripheral region, the weighting parameter W is between 0 and 1, where the output image data is a blend of the overdrive image data and the current image data based on the ratio specified by the weighting parameter. In an embodiment, the output image data may be obtained from the following formula:

$$OUT\_P = W \times OD\_P + (1-W) \times CUR\_P;$$

wherein OUT_P is the output image data, OD_P is the overdrive image data, CUR_P is the current image data, and W is the weighting parameter. With the regional overdrive operation incorporated with the weighting mask 306 as shown in FIG. 4, overdrive is mainly performed on the central region which is more sensitive to a human eye. Therefore, the regional overdrive operation will not influence the image quality evidently.

In order to further reduce the memory space and the computation resource, determination of the weighting mask may be performed before the overdrive operation. Please refer to FIG. 5, which is a schematic diagram of another overdrive device 50 according to an embodiment of the present invention. The overdrive device 50 includes a frame memory 502, an overdrive LUT 504, a weighting mask 506 and a determination unit 510. The determination unit 510 is configured to determine whether the weighting parameter is greater than 0 before the overdrive LUT 504 is found to obtain the overdrive image data. The determination unit 510 may be implemented as a digital logic circuit included in an integrated circuit (IC) of the overdrive device 50. The operations of the frame memory 502, the overdrive LUT 504 and the weighting mask 506 are similar to those of the frame memory 302, the overdrive LUT 304 and the weighting mask 306, and will be omitted herein.

Figure 5:
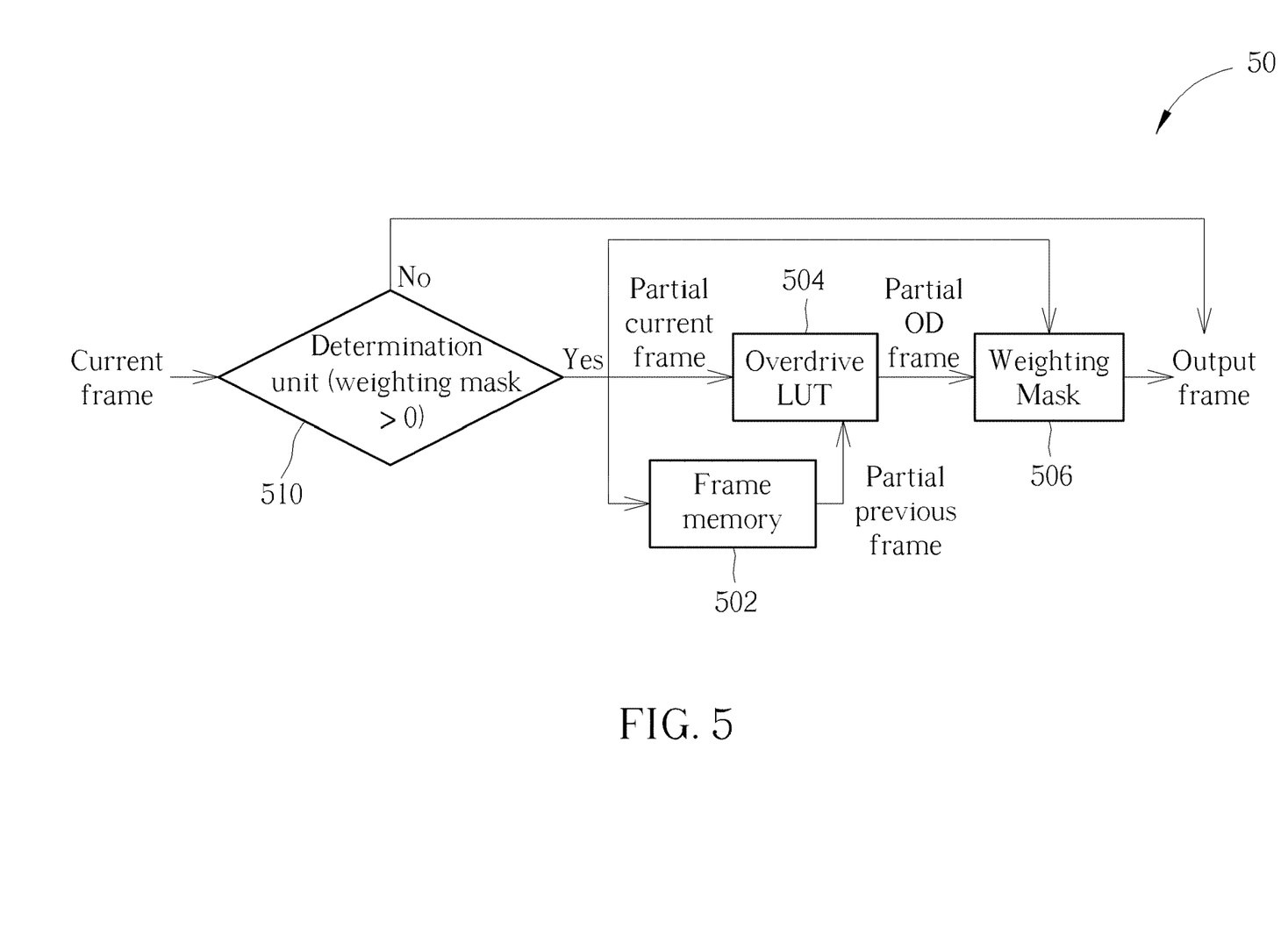
FIG. 5 is a schematic diagram of another overdrive device according to an embodiment of the present invention.

In detail, the determination unit 510 may receive a frame of current image data and determine whether the weighting parameter corresponding to each current image data is greater than 0. If a current image data for a pixel is received and the determination unit 510 determines that the weighting parameter for the corresponding pixel is 0, the current image data may be directly outputted as the output image data without finding the overdrive LUT 504. Only when the weighting parameter is determined to be greater than 0, the overdrive LUT 504 operates to obtain the overdrive image data and the weighting mask 506 calculates the output image data by combining the overdrive image data with the current image data. In this manner, the overdrive LUT 504 only needs to deal with the image data in partial current frame and partial previous frame, and the frame memory 502 only needs to store a part of the previous frame of image data corresponding to the weighting parameters determined to be greater than 0.

Since overdrive is performed on the partial image frame, the frame memory 302 is allocated to store the previous image data in the region where overdrive is required, i.e., the central region and the transition region as shown in FIG. 4. Therefore, the required memory space may be less than the case in the prior art where the frame memory should store the information of the entire previous image frame. The computation resource may also be reduced since the overdrive operation does not need to be performed on every input data.

Please note that the weighting mask of the present invention may be realized in any manners. If an overdrive operation is incorporated with a weighting mask having multiple weighting parameters corresponding to different pixels, the overdrive method is comprised in the scope of the present invention. Specifically, the weighting mask refers to any possible method for defining and/or storing the weightings that specify the degree of overdrive performed on the pixels of the panel. The weighting mask may also be interpreted as any device that records the weightings between the overdrive image data and the current image data.

Figure 6:
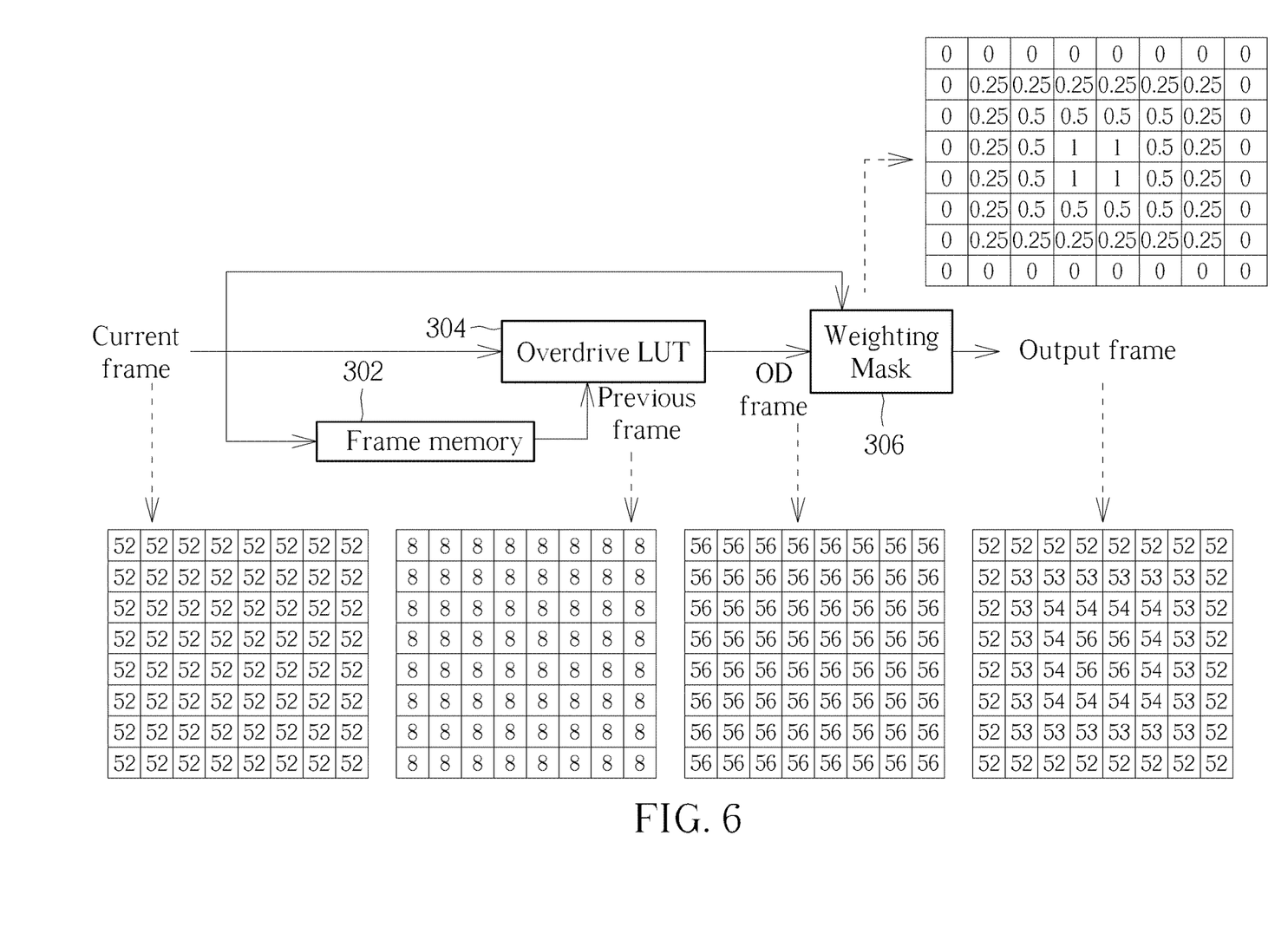
FIG. 6 is a schematic diagram of an example of the weighting mask applied in the overdrive device shown in FIG. 3.

Please refer to FIG. 6, which is a schematic diagram of an example of the weighting mask 306 applied in the overdrive device 30 shown in FIG. 3. As shown in FIG. 6, each frame of image data includes 8×8 pixels specified as an array. The weighting mask 306 specifies that the weighting parameters are the highest in the central region and decrease gradually toward the peripheral region. In this embodiment, the current frame of image data are all 52 and the previous frame of image data are all 8 for easy understanding. After finding the overdrive LUT 304, the overdrive frame may be obtained as image data 56 in all pixels, which allow the liquid crystals in each pixel to react on time. The weighting mask 306 then combines the overdrive image data 56 with the current frame of image data 52 to obtain the frame of output image data. More specifically, in the frame of output image data, the central region with weighting parameters 1 may obtain image data 56 as equal to the overdrive image data, the peripheral region with weighting parameters 0 may obtain image data 52 as equal to the current image data (original image data without overdrive), and the transition region has image data decreasing from central toward peripheral.

Figure 7:
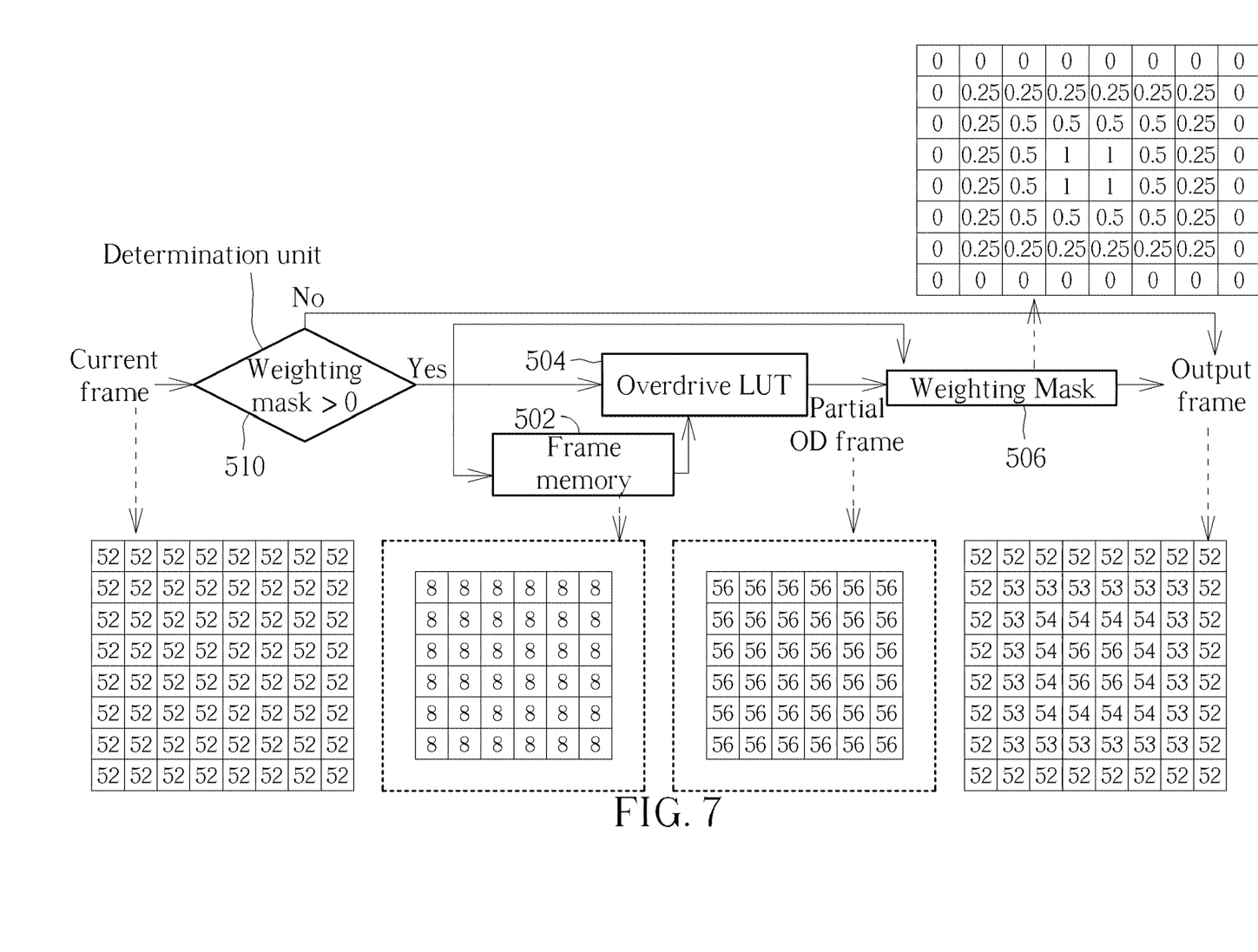
FIG. 7 is a schematic diagram of an example of the weighting mask applied in the overdrive device shown in FIG. 5.

Please refer to FIG. 7, which is a schematic diagram of an example of the weighting mask 506 applied in the overdrive device 50 shown in FIG. 5. The weighting parameters in the weighting mask 506 is implemented the same as the weighting parameters in the weighting mask 306, and the received previous frame and the current frame are identical to those shown in FIG. 6. In this embodiment, the determination unit 50 determines whether the weighting parameter is greater than 0 in advance, and the overdrive operation is required only when the weighting parameter is greater than 0. Therefore, only a part of the previous frame is stored in the frame memory 502, and the generated overdrive frame is partial overdrive frame. As shown in FIG. 7, the peripheral region in the image frame corresponding to weighting parameter 0 is excluded from the stored previous frame and the generated overdrive frame. As a result, in the embodiment with determination of weighting parameters performed in advance, the same output image may be obtained by using less memory space and computation resource.

Figure 8A:
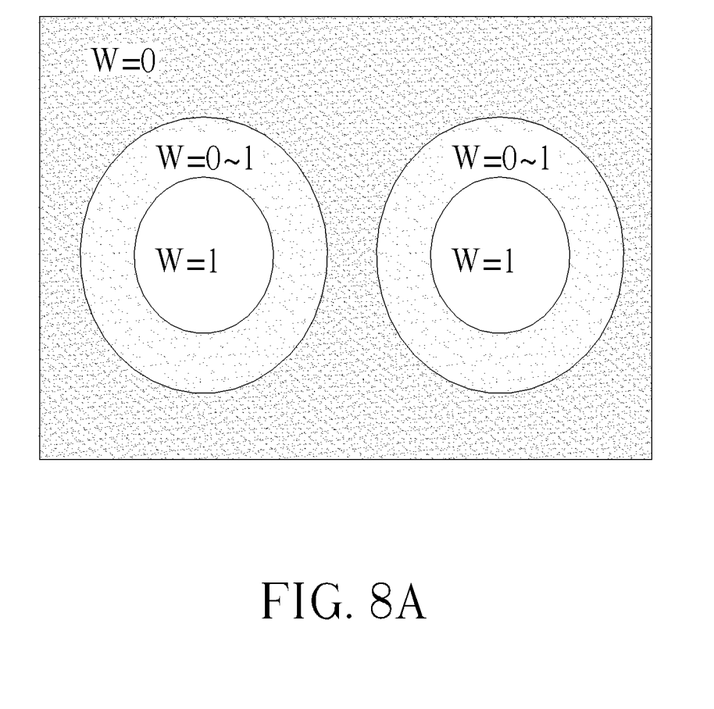
FIGS. 8A-8B are schematic diagrams of other implementations of the weighting mask.
Figure 8B:
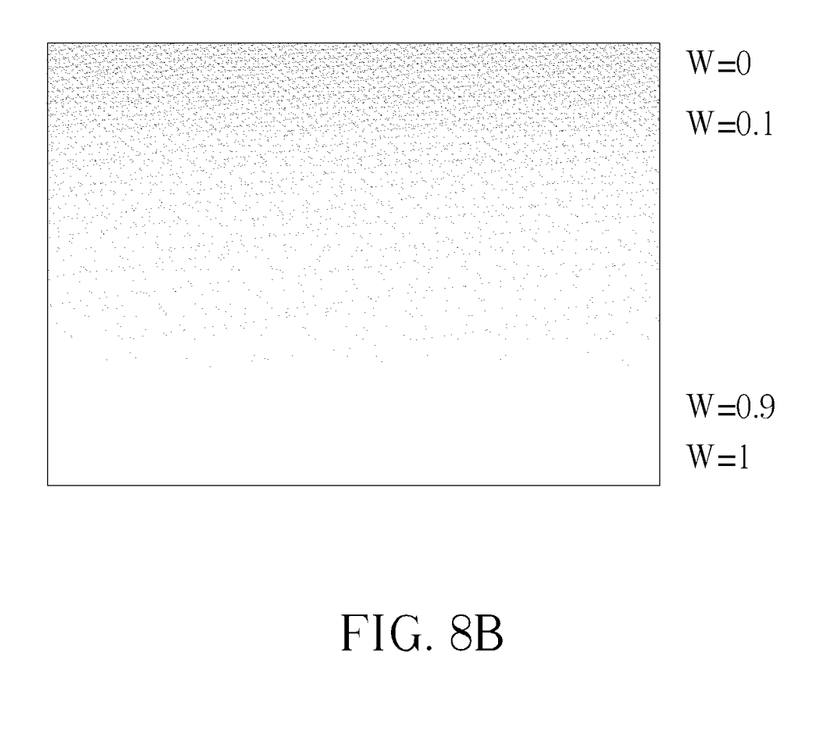

Please note that the present invention aims at providing an overdrive scheme incorporated with a weighting mask specifying the degree of overdrive performed on the position of each pixel. Those skilled in the art may make modifications and alternations accordingly. For example, the weighting mask may be defined by any shape, such as a triangle, circle, square, gradient, dots, and/or the rectangle as shown in FIG. 4. In an embodiment, the weighting mask may be defined by circles. As shown in FIG. 8A, the weighting parameters W=1 in the weighting mask may form two separate circles, with a transition region with W=0~1 around each circle. FIG. 8B illustrates another implementation of the weighting mask. In this embodiment, the weighting parameters form a vertical gradient on the display panel, where the weighting parameter gradually increases from top to bottom. As can be seen, the weighting mask configuration is not limited to a symmetric shape and the higher weighting parameter is not limited in the central region of the panel. In the embodiments of the present invention, the weighting mask may be recorded as an array of weighting parameters. Alternatively or additionally, the weighting mask may be a mathematical representation based on the position of the pixel. For example, the gradient shown in FIG. 8B may be represented by the following mathematical formula:

$$W = \frac{y}{I_H - 1};$$

wherein y is the vertical axis of the pixel and may range from 0 to $I_H-1$, $I_H$ is the pixel number in the vertical direction, and W is the weighting parameter.

In an embodiment, the weighting mask scheme is performed in consideration of the emission of backlight. The backlight provides the brightness of a liquid crystal display (LCD) panel. In general, the emission way of backlight may be divided into the hold type and impulse type. The hold type means that the backlight is always on, such that image sticking may appear on a moving object between different positions in two consecutive image frames. In comparison, in the impulse type, the backlight blinks periodically as impulse signals. The impulse type backlight is preferable since the backlight is configured to be turned on after the image data in the pixel is ready, so as to reduce the image sticking problem. However, sometimes the reaction speed of the liquid crystals is not fast enough to drive the pixel voltage to its target value when the backlight starts to irradiate, and this problem may be solved by overdriving the image data as mentioned above. In order to obtain a more satisfactory image quality, the weighting mask scheme together with overdrive operations may be performed based on the timing of the blinking backlight (BBL).

Figure 9A:
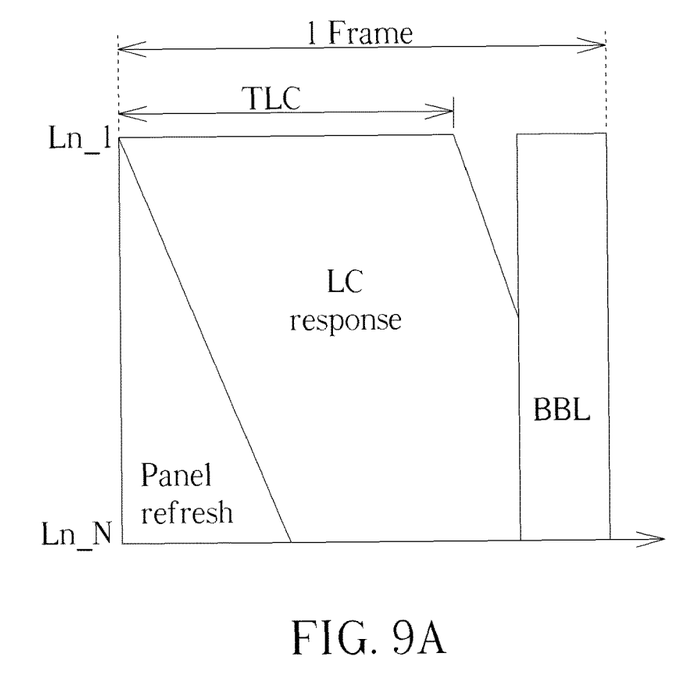
FIG. 9A is a schematic diagram of the relation of the response time of liquid crystals and the timing of BBL.

Please refer to FIG. 9A, which is a schematic diagram of the relation of the response time of liquid crystals (LC) and the timing of BBL. FIG. 9A illustrates a frame time for a display panel to receive a frame of image data. The display panel has N rows of pixels denoted by Ln_1-Ln_N, where a frame of image data is forwarded to the display panel row by row. As shown in FIG. 9A, the first row Ln_1 receives the image data first and the corresponding data lines are charged to their target voltage levels by the corresponding image data after an LC response period TLC. The LC response period TLC refers to a response time for the pixel to reach an expected brightness with the received image data. The other rows of pixels then receive the image data by turns (from up to down), with the same length of the LC response period TLC corresponding to each row of pixels. As a result, the pixels in the upper part of the panel may have enough time to reach their target voltage levels before the BBL is turned on, and thus the luminance values in the upper part of the panel are substantially correct. However, the pixels in the lower part of the panel receive the image data later and may not reach their target voltage levels before the BBL is turned on, so the luminance values displayed with the backlight may start with a wrong image and then change to a correct one, which results in image sticking.

Figure 9B:
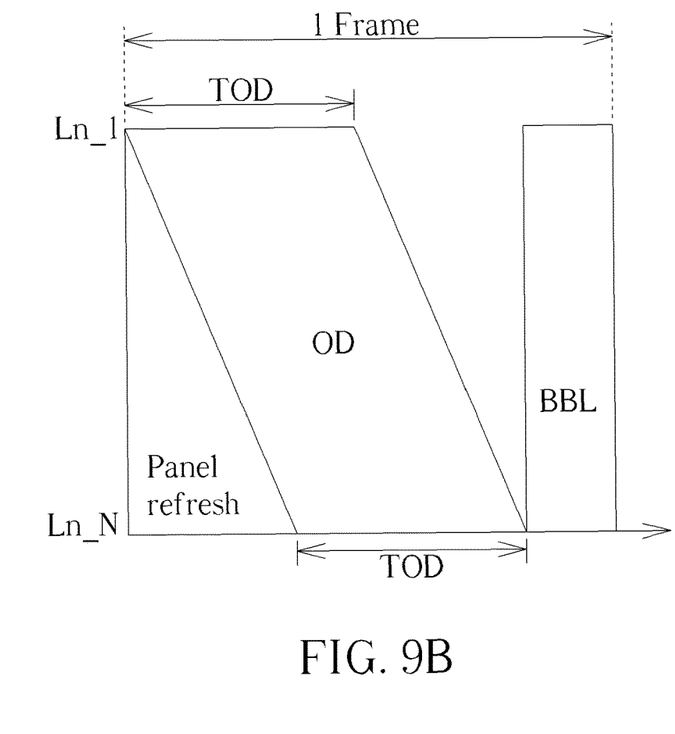
FIG. 9B is a schematic diagram of the relation of the overdrive period and the timing of BBL.

In order to solve the image sticking problem, the overdrive operation is performed, allowing each row of pixels to be charged to their target voltage levels within an overdrive period TOD shorter than the LC response period TLC. The overdrive period TOD refers to a response time for the pixel to reach an expected brightness with the overdrive image data. Preferably, the overdrive operation may be configured to allow the end time of the overdrive period TOD to be aligned with the turned-on time of the BBL. As shown in FIG. 9B, with the overdrive (OD) operation, the last row of pixels in the panel which receive image data lastly are charged to their target voltage levels at the turned-on time of the BBL. In this embodiment, although the response time of liquid crystals is enough to allow the pixels in the last row to reach their target voltage levels, the uniform overdrive scheme lets upper rows of pixels to be overdriven to a wrong voltage value.

Figure 9C:
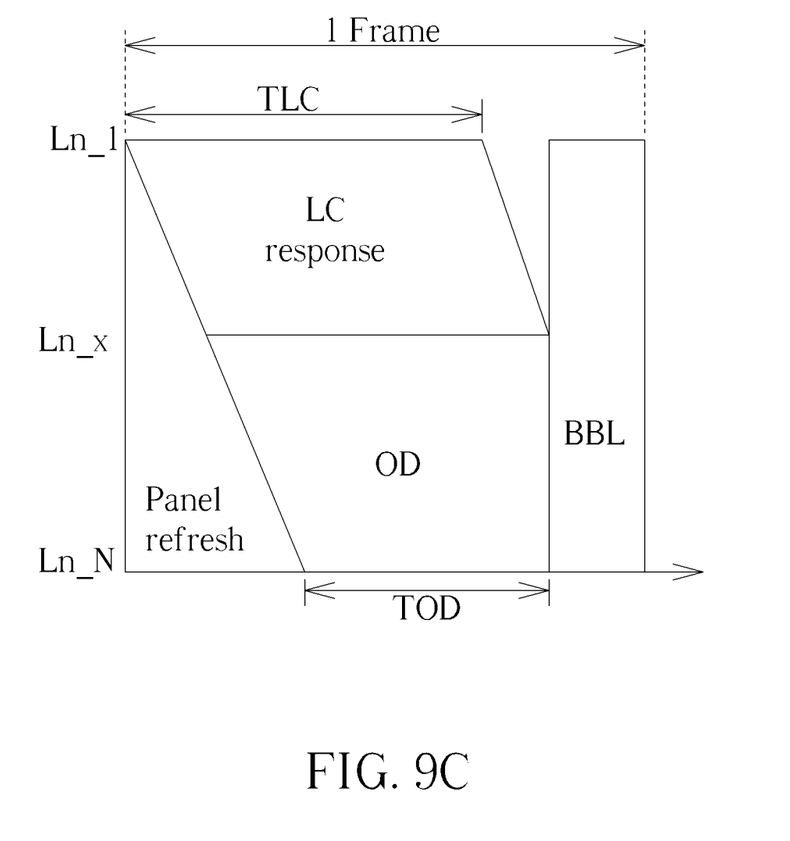
FIG. 9C is a schematic diagram of the relation of the LC response period, the overdrive period and the timing of BBL when the regional overdrive is applied.

Therefore, the overdrive period TOD may further be controlled flexibly when the regional overdrive scheme with a weighting mask is applied to control the degree of overdrive for each row of pixels. FIG. 9C illustrates the relation of the LC response period TLC, the overdrive period TOD and the timing of BBL when the regional overdrive is applied. With the regional overdrive scheme, each pixel or each region on the panel may be selected to undergo overdrive operation or not, and the degree of overdrive may be controlled or adjusted. As shown in FIG. 9C, overdrive is performed on the lower part of the panel only, i.e., performed on the pixel rows Ln_x-Ln_N. The length of the overdrive period TOD in these rows may be well controlled by adjusting the weighting parameters; hence, the overdrive period TOD between the start time of the pixels starting to receive image data and the turned-on time of the BBL allows the liquid crystals to react so that the pixel voltages may reach their target levels exactly. For example, the weighting parameters corresponding to the pixel row Ln_x is approximately equal to 0. The degree of overdrive increases gradually with the increasing weighting parameters for the pixel rows below Ln_x (which generates shorter overdrive periods TOD). Finally, the weighting parameters corresponding to the last pixel row Ln_N may be equal to 1.

Figure 9D:
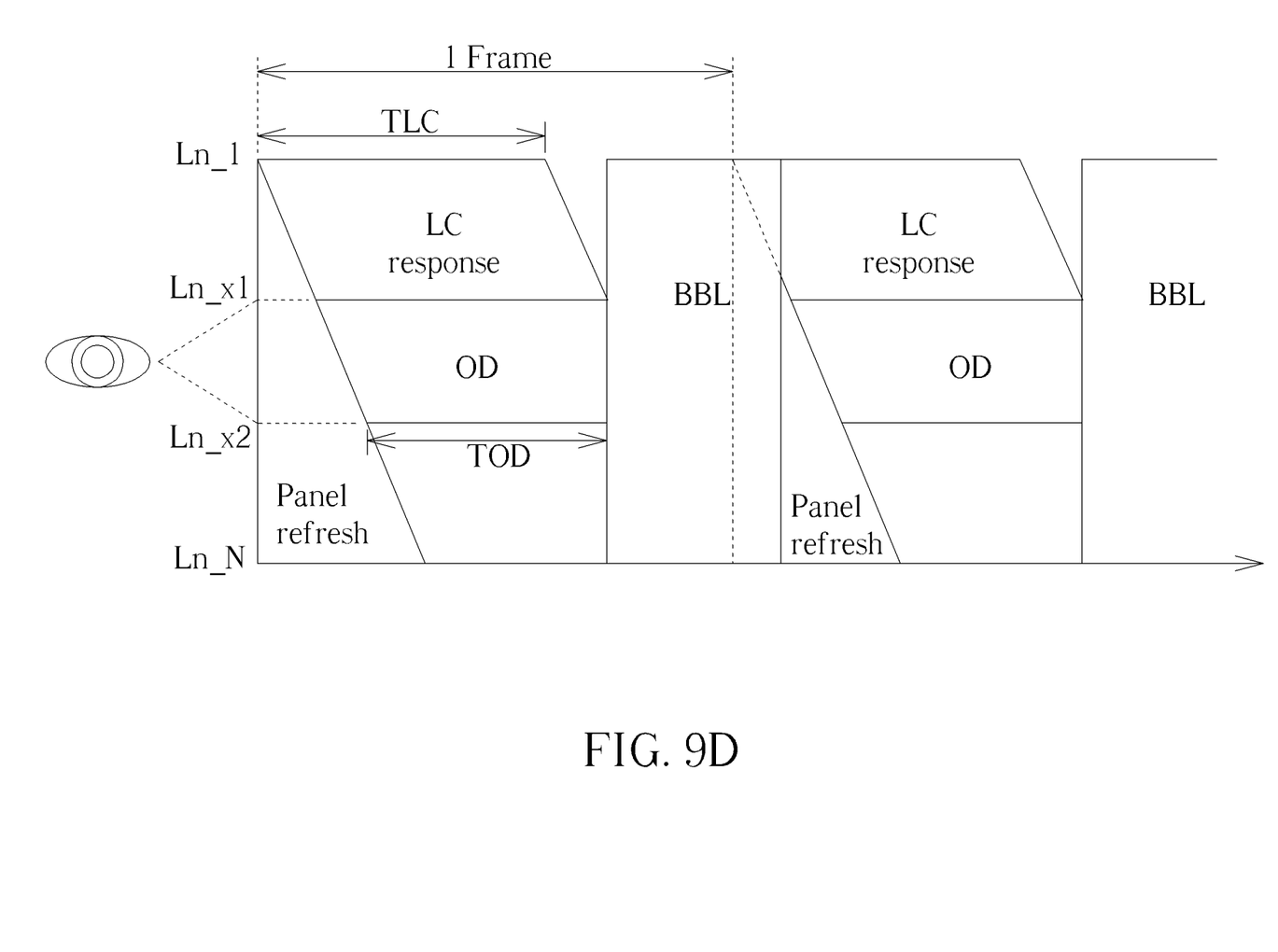
FIG. 9D is a schematic diagram of the relation of the LC response period, the overdrive period and the timing of BBL when the regional overdrive is applied to the central region only.

FIG. 9D illustrates the relation of the LC response period TLC, the overdrive period TOD and the timing of BBL when the regional overdrive is applied to the central region only. As mentioned above, a human eye usually focuses on the central region of the screen; hence, the overdrive schemes for the upper and lower regions may be omitted. Therefore, only the central region is considered for determining the degree of overdrive. In other words, the pixels in the central region between pixel rows Ln_x1 and Ln_x2 undergo overdrive to increase the reaction speed of liquid crystals (where the weighting parameters are greater than 0), while the pixels in other regions receive current image data without overdrive (where the weighting parameters are equal to 0). As shown in FIG. 9D, since the range of regional overdrive is different from the embodiment shown in FIG. 9C, the BBL may be selected to be turned on at a preferable time. In this embodiment, the BBL is turned on earlier, to be aligned with the overdrive period TOD of the row of pixels lastly receiving the image data among those rows configured with the weighting parameter greater than 0, i.e., the pixel row Ln_x2.

Since the BBL is turned on earlier, the BBL will irradiate for a longer time in each cycle. The BBL may determine the brightness of the image shown on the panel. In order to achieve the same brightness, the longer irradiation time allows the impulse signal for triggering the BBL to be smaller, which reduces the entire power consumption.

Alternatively or additionally, the BBL may be turned off later to further increase the turned-on time of the BBL, and this implementation gains more benefits on less power consumption. In the embodiment as shown in FIG. 9D, the BBL is turned off after the next image frame starts to be received. Because the human eye is more sensitive to the central region, the image quality of the upper parts of the panel may be slightly reduced without evidently influencing the user experience. Therefore, the turned-off time of the BBL may be later than a time point of the next frame of image data starting to be received by the display panel, and more specifically, by the first row of pixels in the panel which receive image data firstly, i.e., Ln_1. Although the image sticking may appear in the upper region due to the extended BBL, this region is not noted by the user and thus the image quality in this region needs not to be carefully considered. As long as the turned-off time of the BBL is earlier than or aligned with the time point of the pixels in the central region starting to receive image data, the image quality may not be influenced. In this embodiment, the turned-off time of the BBL is aligned with the start time of the pixel row receiving image data firstly among those configured with the weighting parameter greater than 0, i.e., Ln_x1. Therefore, the image quality of the central region may not be reduced due to the extended BBL.

As a result, the BBL may be turned on earlier and/or turned off later, which extends the irradiation time of backlight in a cycle; hence, the entire brightness of the BBL may be achieved by lower driving signals, so that power consumption may be saved.

The overdrive device of the present invention may be realized in various manners in a display control system. For example, a logic circuit may be applied and allocated to realize the regional overdrive method of the overdrive device. In an embodiment, the overdrive device may be implemented as an independent IC disposed between the timing controller IC and the source driver IC. In another embodiment, the overdrive device may be included in the timing controller IC, where the image data outputted from the timing controller to the source driver include information regarding the current image data and/or the overdrive image data based on the weighting mask. In a further embodiment, the overdrive device, the timing controller and the source driver may be integrated in a single IC, so as to simplify the system structure. Those skilled in the art understand that the method of realizing the overdrive device should not be considered as a limitation of the scope of the present invention.

Figure 10:
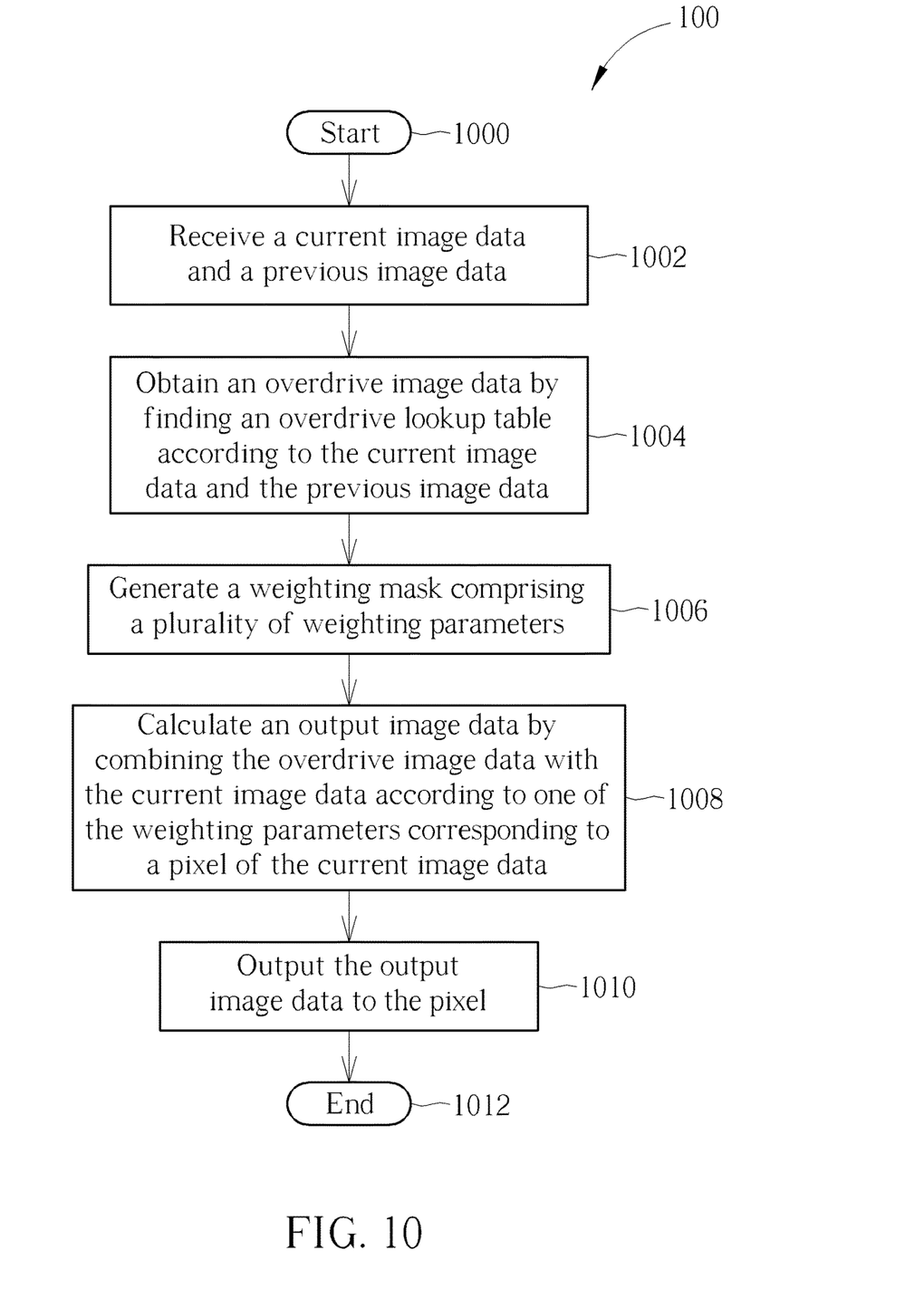
FIGS. 10 and 11 are flowcharts of an overdrive process according to embodiments of the present invention.

The abovementioned regional overdrive scheme and the implementations of the overdrive device and the weighting mask may be summarized into an overdrive process 100, as shown in FIG. 10. The overdrive process 100 may be realized in an overdrive device such as the overdrive device 30 or 50, for processing an image data for a pixel by determining the degree of overdrive. The overdrive process 100 includes the following steps:

Step 1000: Start.

Step 1002: Receive a current image data and a previous image data.

Step 1004: Obtain an overdrive image data by finding an overdrive lookup table according to the current image data and the previous image data.

Step 1006: Generate a weighting mask comprising a plurality of weighting parameters.

Step 1008: Calculate an output image data by combining the overdrive image data with the current image data according to one of the weighting parameters corresponding to a pixel of the current image data.

Step 1010: Output the output image data to the pixel.

Step 1012: End.

Figure 11:
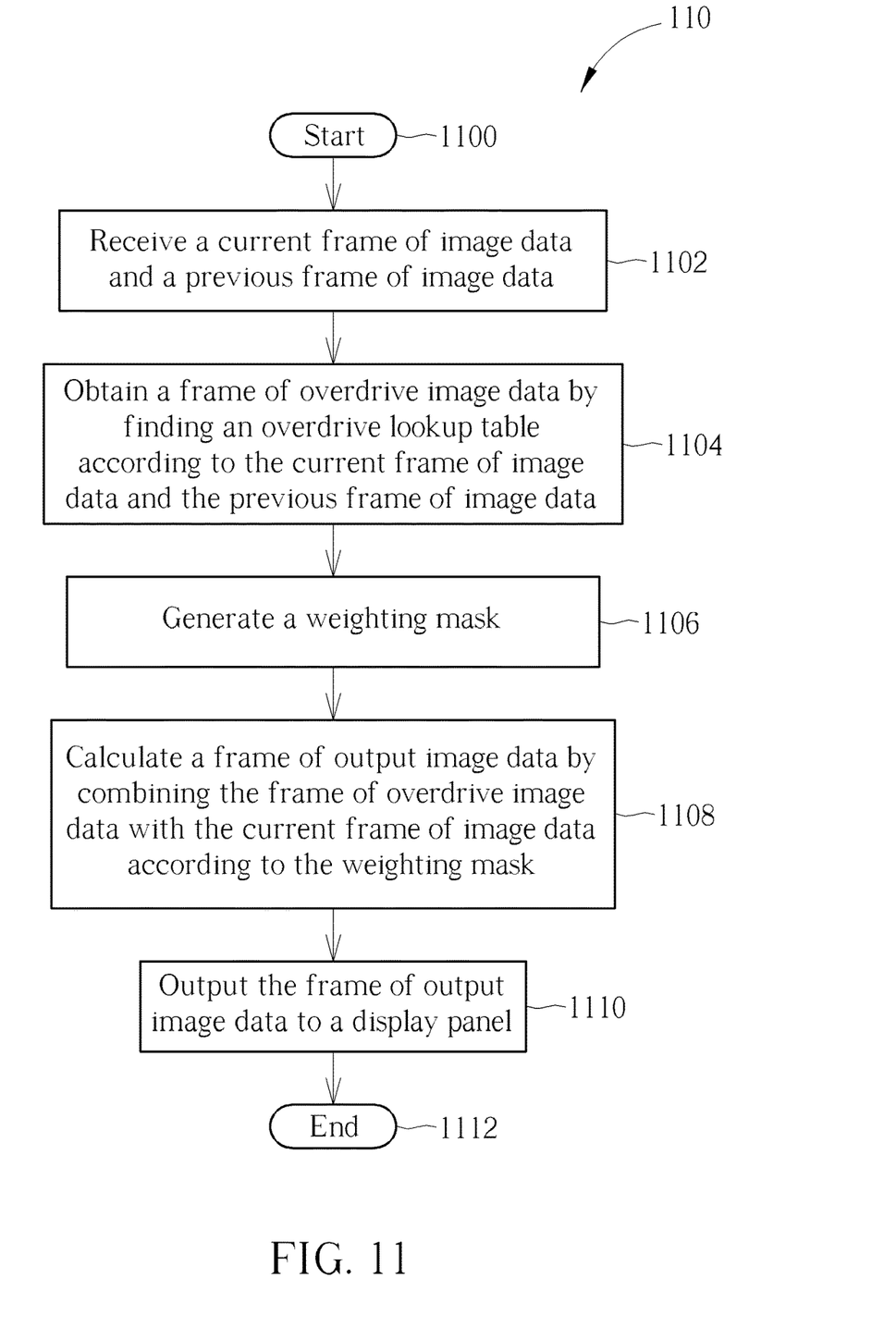

The regional overdrive scheme in the frame viewpoint may be summarized into another overdrive process 110, as shown in FIG. 11. The overdrive process 110 may be realized in an overdrive device such as the overdrive device 30 or 50, for processing a frame of image data by determining the degree of overdrive. The overdrive process 110 includes the following steps:

Step 1100: Start.

Step 1102: Receive a current frame of image data and a previous frame of image data.

Step 1104: Obtain a frame of overdrive image data by finding an overdrive lookup table according to the current frame of image data and the previous frame of image data.

Step 1106: Generate a weighting mask.

Step 1108: Calculate a frame of output image data by combining the frame of overdrive image data with the current frame of image data according to the weighting mask.

Step 1110: Output the frame of output image data to a display panel.

Step 1112: End.

The detailed operations and alternations of the overdrive processes 100 and 110 are illustrated in the above paragraphs and will not be narrated herein.

To sum up, the present invention provides a regional overdrive method which is capable of performing overdrive on partial image frame. A weighing mask is applied to specify the degree of overdrive for each pixel in the panel based on the weighting parameter corresponding to each pixel. The weighting parameter refers to the ratio or weighting of overdrive image data in the combination of the overdrive image data and the input image data without overdrive. In an embodiment, the overdrive operation is mainly performed on the central region of the panel where a human eye may focus on, and the weighting mask is allocated accordingly, where the central region may be configured with higher weighting parameters. Since the regional overdrive is performed on a part of the image frame, the computation resource and the memory space for storing the previous frame data may be saved. In another embodiment, the overdrive is performed in consideration of the emission of backlight, where the degree of overdrive in each row of pixels is configured to allow the backlight to be turned on at the time when the pixel data reaches their target voltage levels. This further improves the image sticking problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling overdrive for image data, comprising:
   receiving a current image data and a previous image data;
   obtaining an overdrive image data by finding an overdrive lookup table according to the current image data and the previous image data;
   generating a weighting mask comprising a plurality of weighting parameters;
   calculating an output image data by combining the overdrive image data with the current image data according to a first weighting parameter among the weighting parameters, wherein the first weighting parameter corresponds to a position of a pixel of the current image data; and
   outputting the output image data to the pixel.

2. The method of claim 1, wherein the first weighting parameter is a weighting of the overdrive image data in the combination of the overdrive image data and the current image data.

3. The method of claim 1, further comprising:
   determining whether the first weighting parameter is greater than 0 before finding the overdrive lookup table.

4. The method of claim 3, further comprising:
   calculating the output image data by combining the overdrive image data with the current image data only when the first weighting parameter is greater than 0; and
   outputting the current image data as the output image data when the first weighting parameter is equal to 0.

5. The method of claim 1, further comprising:
   determining whether each of the weighting parameters is greater than 0; and
   storing a part of a previous frame of image data in a frame memory;
   wherein the stored part of the previous frame of image data corresponds to the weighting parameters determined to be greater than 0.

6. The method of claim 1, wherein the weighting mask comprises at least one of the weighting parameters forming a shape, a vertical gradient of the weighting parameters on a display panel, an array of the weighting parameters, and a mathematical representation based on the position of the pixel.

7. The method of claim 1, wherein an end time of an overdrive period is configured to be aligned with a turned-on time of a blinking backlight, wherein the overdrive period allows a specific row of pixels to be charged to a target voltage level by the corresponding output image data.

8. The method of claim 7, wherein the specific row of pixels is a row of pixels in a display panel lastly receiving the output image data or a row of pixels configured with the weighting parameter greater than 0 lastly receiving the output image data.

9. The method of claim 7, wherein a turned-off time of the blinking backlight is configured to be later than a next frame of image data starting to be received by a row of pixels in a display panel firstly receiving the output image data and configured to be earlier than or aligned with a start time of a row of pixels configured with the weighting parameter greater than 0 starting to receive the output image data.

10. An overdrive device, comprising:
    a frame memory, configured to store a previous image data;
    an overdrive lookup table, coupled to the frame memory, configured to receive the previous image data from the frame memory and receive a current image data from an input terminal, and obtain an overdrive image data according to the current image data and the previous image data; and
    a weighting mask, coupled to the overdrive lookup table, the weighting mask comprising a plurality of weighting parameters, and configured to calculate an output image data by combining the overdrive image data with the current image data according to a first weighting parameter among the weighting parameters, wherein the first weighting parameter corresponds to a position of a pixel of the current image data;

wherein the output image data is outputted to the pixel.

11. The overdrive device of claim 10, wherein the first weighting parameter is a weighting of the overdrive image data in the combination of the overdrive image data and the current image data.

12. The overdrive device of claim 10, further comprising:
a determination unit, coupled to the frame memory and the overdrive lookup table, configured to determine whether the first weighting parameter is greater than 0 before the overdrive lookup table obtains the overdrive image data.

13. The overdrive device of claim 12, wherein the weighting mask calculates the output image data by combining the overdrive image data with the current image data only when the first weighting parameter is greater than 0;

wherein the current image data is outputted as the output image data when the first weighting parameter is equal to 0.

14. The overdrive device of claim 10, further comprising:
a determination unit, coupled to the frame memory and the overdrive lookup table, configured to determine whether each of the weighting parameters is greater than 0;

wherein the frame memory is configured to store a part of a previous frame of image data, and the stored part of the previous frame of image data corresponds to the weighting parameters determined to be greater than 0.

15. The overdrive device of claim 10, wherein the weighting mask comprises at least one of the weighting parameters forming a shape, a vertical gradient of the weighting parameters on a display panel, an array of the weighting parameters, and a mathematical representation based on the position of the pixel.

16. The overdrive device of claim 10, wherein an end time of an overdrive period is configured to be aligned with a turned-on time of a blinking backlight, wherein the overdrive period allows a specific row of pixels to be charged to a target voltage level by the corresponding output image data.

17. The overdrive device of claim 16, wherein the specific row of pixels is a row of pixels in a display panel lastly receiving the output image data or a row of pixels configured with the weighting parameter greater than 0 lastly receiving the output image data.

18. The overdrive device of claim 16, wherein a turned-off time of the blinking backlight is configured to be later than a next frame of image data starting to be received by a row of pixels in a display panel firstly receiving the output image data and configured to be earlier than or aligned with a start time of a row of pixels configured with the weighting parameter greater than 0 starting to receive the output image data.

19. A method of handling overdrive for image data, comprising:
receiving a current frame of image data and a previous frame of image data;
obtaining a frame of overdrive image data by finding an overdrive lookup table according to the current frame of image data and the previous frame of image data;
generating a weighting mask;
calculating a frame of output image data by combining the frame of overdrive image data with the current frame of image data according to the weighting mask, wherein the weighting mask comprises a plurality of weighting parameters each corresponding to a position of a pixel in the current frame of image data; and
outputting the frame of output image data to a display panel.

* * * * *